(No Model.)
J. K. PATTERSON.
AUTOMATIC DROP FOR CORN PLANTERS.
No. 600,019. Patented Mar. 1, 1898.
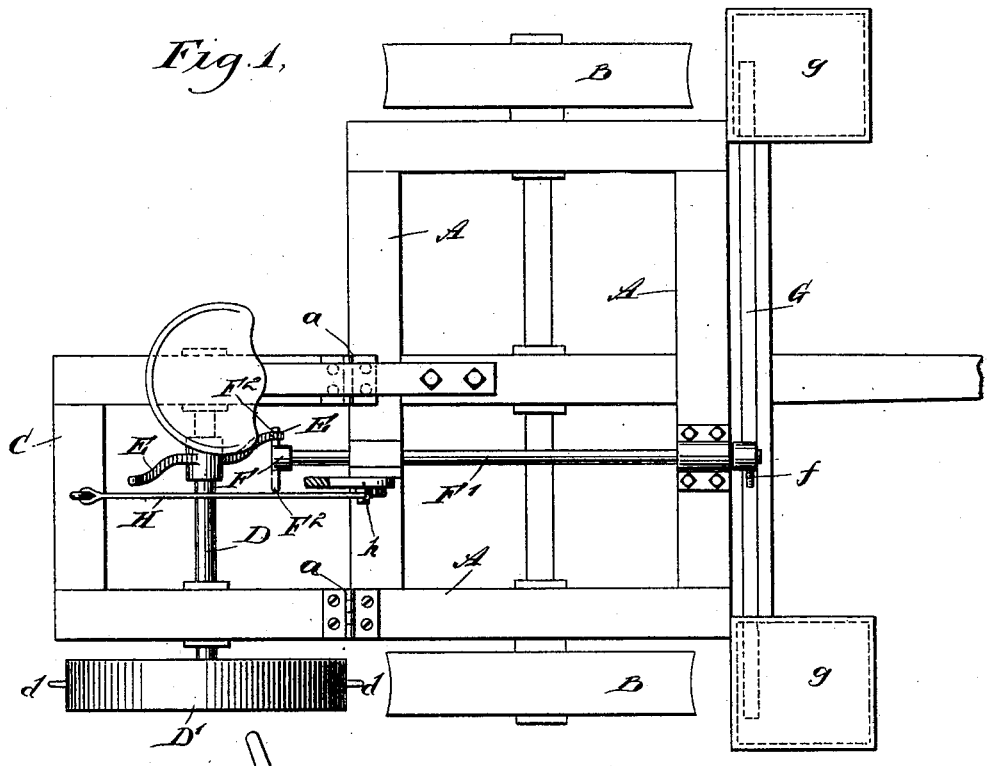
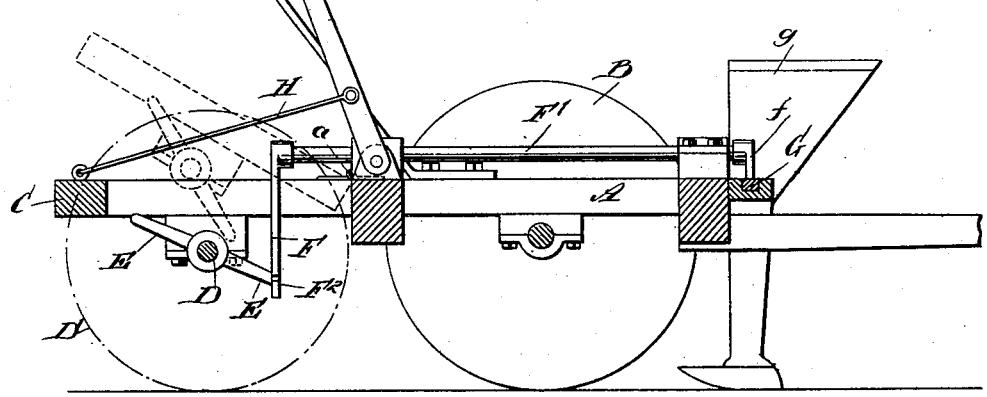
WITNESSES:
Edward Thorpe
H. L. Reynolds
INVENTOR
J. K. Patterson
BY
ATTORNEYS.

UNITED STATES PATENT OFFICE.

JAMES K. PATTERSON, OF CRETE, NEBRASKA.

AUTOMATIC DROP FOR CORN-PLANTERS.

SPECIFICATION forming part of Letters Patent No. 600,019, dated March 1, 1898.

Application filed April 20, 1897. Serial No. 632,963. (No model.)

*To all whom it may concern:*

Be it known that I, JAMES K. PATTERSON, of Crete, in the county of Saline and State of Nebraska, have invented a new and Improved Automatic Drop for Corn-Planters, of which the following is a full, clear, and exact description.

My invention relates to an improvement in the dropping means for corn-planters, consisting of an automatic drop comprising an auxiliary frame hinged to the rear frame of the planter and carrying a shaft which is rotated by a wheel which rests upon the ground when the frame is dropped to a horizontal position, but which clears the ground when the frame is raised. It also comprises contact-arms fixed upon this shaft and upon a longitudinal shaft which coact to reciprocate a dropping mechanism of any suitable or usual form.

Reference is to be had to the accompanying drawings, forming a part of this specification, in which similar characters of reference indicate corresponding parts in the several views.

Figure 1 is a plan view of my device. Fig. 2 is a longitudinal sectional elevation thereof, and Fig. 3 is an elevation of the arms upon the rear end of the oscillating shaft F'.

My device is applicable to corn-planters of any usual construction. The frame A, wheels B, and hoppers $g$ are of any usual construction. The dropping mechanism contemplated in the device, as shown in the drawings, comprises a reciprocating bar G, which operates to drop the corn when the bar is reciprocated. Any dropping mechanism which may be operated from an oscillating shaft may be used in connection with my device.

Mounted upon and above the main frame A is a longitudinal shaft F', which at its forward end has an arm $f$, engaging the reciprocating bar G of the usual dropping mechanism, so that when the shaft F' is oscillated the bar G will be reciprocated. At the rear end of the shaft F' is attached a downwardly-extending bar F, which is divided at its lower end, the forks $F^2$ thereof being bent to each side. These arms are alternately engaged by the ends of the revolving arms E, hereinafter described, so as to throw the bar F first to one side and then to the other.

At the rear of the frame A, at the point $a$, is pivoted the auxiliary frame C, attached by a rod H to a lever $h$, by means of which the frame may be thrown up to the position shown in dotted lines in Fig. 2. Journaled upon the frame C is a lateral shaft D, upon one end of which is a wheel D', which contacts with the ground when the frame is dropped to the horizontal position. This wheel D' may, if desired, be provided with projecting pins $d$, which will indicate the position where the seed will be dropped.

Upon the inner end of the shaft D is fixed a collar having oppositely-extending arms E thereon. These arms are bent oppositely to one side, so that their ends will alternately strike opposite forks $F^2$ of the bar F. One of the arms E will strike one of the forks $F^2$ and oscillate the shaft F' in one direction. When the other arm E comes around, it will strike the opposite fork $F^2$ on the bar F and oscillate the shaft F' in the opposite direction, thus communicating a reciprocating motion to the bar G.

When it is desired to throw the dropping mechanism out of operation, the frame C is thrown up, as indicated by dotted lines in Fig. 2. This raises the wheel D' from the ground and at the same time raises the shaft D, so that the arms E will not engage the forks $F^2$. The dropping mechanism can then be operated by hand, if desired.

It is evident that the distance intervening between the hills of corn will be determined by the diameter of the wheel D' and also by the number of the arms E. Instead of two arms, as shown in the drawings, this number might be increased to four or any multiple of two.

Having thus described my invention, I claim as new and desire to secure by Letters Patent—

An automatic dropping device for corn-planters comprising an auxiliary frame pivoted to the rear of the planter-frame, to swing upward and forward, and carrying a cross-shaft journaled upon the under side of the said frame, and having on one end thereof a wheel which runs upon the ground behind one of the planter-wheels, a horizontal rock-shaft mounted on bearings above the planter-frame and extending longitudinally near the center thereof, a downwardly-extending arm fixed to its front end, and engaging the feed-slide or dropping-bar of the planter, a downwardly-extending arm fixed to the rear end of said shaft and having its lower end forked with the forks bent outward and laterally in a curve, and a collar fixed to the cross-shaft of the auxiliary frame in line with the longitudinal shaft, said collar having two opposite radially-extending arms which are curved laterally in opposite directions, their ends being adapted to alternately engage opposite sides of the forked arm upon the longitudinal shaft to oscillate the same.

JAMES K. PATTERSON.

Witnesses:
D. B. ZOOK,
H. M. COLE.